United States Patent [19]

Burger

[11] E Re. 30,093

[45] Reissued Sep. 11, 1979

[54] AEROSOL DISPENSING SYSTEM

[76] Inventor: Norman D. Burger, 11621 Segrell Way, Culver City, Calif. 90230

[21] Appl. No.: 867,456

[22] Filed: Jan. 6, 1978

Related U.S. Patent Documents

Reissue of:

[64] Patent No.: 3,938,708
Issued: Feb. 17, 1976
Appl. No.: 544,390
Filed: Jan. 27, 1975

U.S. Applications:

[63] Continuation-in-part of Ser. No. 497,613, Aug. 15, 1974, abandoned, which is a continuation-in-part of Ser. No. 466,140, May 2, 1974, abandoned.

[51] Int. Cl.[2] ..... B65D 35/28

[52] U.S. Cl. ..... 222/95; 222/192; 239/323

[58] Field of Search ..... 222/94, 95, 386.5, 192, 222/320, 394, 192; 239/323

[56] References Cited

U.S. PATENT DOCUMENTS

| | | | |
|---|---|---|---|
| 2,671,578 | 3/1954 | McBean | 222/386.5 X |
| 2,823,953 | 2/1958 | McGeorge | 222/320 |
| 3,207,386 | 9/1965 | Presant et al. | 222/192 |
| 3,402,665 | 9/1968 | Tarpley, Jr. et al. | 222/394 X |
| 3,460,714 | 8/1969 | Mace | 222/394 X |
| 3,547,854 | 12/1970 | Roth et al. | 222/192 X |
| 3,554,771 | 1/1971 | Wiczer | 222/192 |
| 3,788,521 | 1/1974 | Laauwe | 222/94 |

FOREIGN PATENT DOCUMENTS

| | | | |
|---|---|---|---|
| 740635 | 11/1955 | United Kingdom | 222/94 |

*Primary Examiner*—Stanley H. Tollberg
*Attorney, Agent, or Firm*—Smyth, Pavitt, Siegemund, Jones & Martella

[57] ABSTRACT

An aerosol dispensing system having an outer container, compressible inner container positioned within the outer container, means to compress the compressible container, and a mechanical breakup spray head and valve assembly connected to the compressible container. A relatively non-foaming liquid product is present at a pressure above atmospheric pressure within the compressible container as well as a neutral propellant or mixture of propellants which are in a liquid state and are at least partially soluble or miscible in the liquid product. A second propellant may be present in a propellant region between the compressible container and outer container with the second propellant exerting a differential pressure across the compressible container which is sufficient to eject the product and neutral propellant through the mechanical breakup spray head on opening of the valve assembly. The neutral propellant is present in a relatively small amount, e.g., about 25 percent or less by volume of the volume of the product and neutral propellant and generally about 10 percent or less with the neutral propellant being at least partially vaporized at atmospheric pressure or less on passage of the product and neutral propellant through the spray head to create a turbulence within the spray head which provides a breaking up of the liquid product into a fine spray.

An aerosol dispensing system with a mechanical breakup spray head and valve assembly connected to compressible container positioned within an outer container with a finely divided powder product at a pressure above atmospheric pressure within the container. Also present within the compressible container is a liquified neutral propellant in an amount sufficient to form a slurry with the product and to carry the product into the spray head during discharge of the product. The neutral propellant is at least partially vaporized at atmospheric pressure or less on passage of the product and neutral propellant through the spray head to create turbulence within the spray head.

35 Claims, 1 Drawing Figure

AEROSOL DISPENSING SYSTEM

Matter enclosed in heavy brackets [ ] appears in the original patent but forms no part of this reissue specification; matter printed in italics indicates the additions made by reissue.

RELATED APPLICATIONS

This application is *a reissue of my U.S. Pat. 3,938,708 which was filed as U.S. Application Ser. No. 544,390 on Jan. 27, 1975 which is* a continuation-in-part of my prior [copending] application Ser. No. 497,613, filed Aug. 15, 1974 now abandoned, which is in turn a continuation-in-part of my [copending] application Ser. No. 466,140, entitled "AEROSOL DISPENSING ARRANGEMENT" which was filed on May 2, 1974, now abandoned.

BACKGROUND OF THE INVENTION

A wide variety of products are now packaged for dispensing as a finely divided aerosol spray. For example, such products include hair sprays, deodorants, food products, etc. While many products have been successfully dispensed as aerosols, a wide variety of products are, however, not amenable to being dispensed in this manner.

By way of background, in dispensing a product as an aerosol, the product which is usually in the form of a liquid, is placed within a pressurizable container and a propellant is then added to the product. Then, during dispensing of the product as an aerosol, the mixture of product and propellant is discharged from the container through a spray nozzle with the product being discharged in the form of a fine spray.

In general, there are two main types of propellants which may be used for aerosol systems, these being hydrocarbon propellants and halogenated hydrocarbon propellants. Both types of propellants have their drawbacks and, thus, in practice the particular propellant which is employed for a particular application is dictated by the nature of the product which is being dispensed.

To generate the pressure required to dispense a product in the form of an aerosol, the propellant must, in general, be present in a sufficient amount in admixture with the liquid product to carry the product through the spray head and to generate an internal pressure within the product container to accomplish this, e.g., generally about 30 psig or higher. The particle size of the product, after its discharge through a spray head, is a function of the viscosity of the product and also the pressure generated by the aerosol propellant. In general, as the viscosity of the product is increased, the size of the product particles discharged through the spray head is increased. Conversely, as the propellant pressure is increased, the size of the product particles is reduced.

Based on the above considerations, it might appear that any liquid product, no matter how viscous, could be packaged as an aerosol merely by adding sufficient propellant to generate a driving force that would be adequate to break up the product into a fine spray on discharge of the product through a spray head. In fact, however, the formulation of a successful aerosol system is complicated by a host of other factors which make it impossible to arrive at a satisfactory system merely by increasing the internal propellant pressure to whatever level may be dictated by the viscosity of the product.

As a first consideration, many propellants are incompatible with specific products at the relatively high propellant levels required to generate the necessary propellant pressure for discharge of the product as a fine spray. For example, many aerosol systems require a propellant-to-product volume ratio of about 50:50 to generate a sufficient propellant pressure to eject the product as a fine spray. In fact, some products, such as a frying pan spray, may require a propellant-to-product volume ratio of as high as about 95:5 to break up the viscous vegetable oil product into a fine spray.

At high propellant levels, the internal pressure generated by the propellant within an aerosol container may pose substantial safety problems unless the container is specially constructed to withstand high internal pressures. The vapor pressure of the propellant will vary with the ambient temperature which may be as high as 110° to 120° F. in some areas where the product is used. Even though an aerosol system is designed for an ambient temperature of about 70° F., the propellant container must, therefore, be sufficiently strong to withstand the higher pressures which are developed by the propellant at higher ambient temperatures. The cost of the aerosol product will be determined, to a large extent, by the cost of the aerosol container. Thus, if the pressure demands of an aerosol system require the use of an expensive high pressure aerosol container, the aerosol product may be economically unfeasible.

Further, as the propellant-to-product volume ratio is increased, the amount of product is reduced. This may make the aerosol product unattractive to the consumer who must then purchase a relatively large quantity of propellant to obtain a relatively small quantity of product. This situation is illustrated by aerosol frying pan sprays where the consumer may have to purchase 95 percent by volume of propellant merely to obtain 5 percent by volume of the product. Also, as the propellant-to-product ratio is increased, the use life of the aerosol system is reduced due to the smaller quantity of the product which is present. This wll also make the aerosol product less attractive to the consumer.

In addition to the economic problems which are posed by aerosol systems that require a relatively large amount of propellant, there may also be compatibility problems between the propellant and product at high propellant-to-product volume ratios. For example, liquified hydrocarbon propellants are generally incompatibile with water base paints at the higher propellant-to-product volume ratios with the product forming a gel which cannot be ejected through a mechanical breakup nozzle in the form of a line spray. Halogenated hydrocarbon propellants, such as the products sold by E. I. DuPont de Nemours under the trade name "FREON" also have compatibility problems with various types of products. In order for a propellant to be used with a particular product, the propellant must be miscible, to some degree, with the product. However, halogenated hydrocarbon propellants are generally immiscible with water based products with the propellant and product forming separate layers and the propellant, thereby, not functioning to discharge the product as a fine spray through a spray nozzle.

In addition to compatibility problems, the use of a particular propellant in a given aerosol system may create still further problems. Hydrocarbon propellants are generally flammable in air at higher concentrations. Thus, when the driving force for the propellant system requires a high propellant-to-product volume ratio, a hydrocarbon propellant will generally be unsuitable for reasons of safety.

Also, halogenated hydrocarbon propellants are generally toxic and may form phosgene if contacted by flame. In addition, halogenated hydrocarbon propellants are expensive. Because of their toxicity, halogenated hydrocarbon propellants are generally unsuitable for use in an ingestible food product.

Due to the various problems of cost, safety, compatibility, flammability, toxicity, etc., as enumerated above, certain types of products are dispensed from containers in which the product is physically separated from a propellant that is used to discharge the product from the container. These types of containers, which may be termed "barrier packs", are exemplified by the barrier pack sold under the name "SEPRO" by Continental Can Company and that sold under the track name "POWER-FLOW" by American Can Company.

In a barrier pack, a flexible inner container for the product is progressively collapsed by the pressure generated by a propellant in the region between a rigid outer container and the flexible inner container. The product is, thereby, extruded through an opening leading from the collapsible inner container. If the product being dispensed from a barrier pack container is a foamable product, such as a shaving cream, the liquid product within the flexible inner container may also contain a propellant in admixture therewith. Then, when the product has been extruded from the inner container, the propellant within the product will undergo vaporization at ambient pressures to produce foam. Such an aerosol package is shown in the Lauwe patent, U.S. Pat. No. 3,788,521, dated Jan. 29, 1974.

The foregoing problems have sharply limited the usage of aerosol dispensing systems for various products and have generally precluded their use for products such as viscous water base products, ingestible food products, etc. Thus, it would be highly desirable to provide an aerosol dispensing system which would not be subject to the various drawbacks encountered with present aerosol systems and which could be used to dispense essentially any type of liquid or powdered product including viscous water base paints and ingestible food products.

SUMMARY OF THE INVENTION

In accord with the present invention, I have provided an aerosol dispensing system which is capable of usage with essentially any type of product, including products such as high viscosity water base paints which previously could not be dispensed in the form of a fine spray by any known aerosol system. Through use of the aerosol dispensing system of the invention, the problems which have long plagued the aerosol industry, such as incompatibility of the product and propellant, flammability of the propellant, toxicity of the propellant, etc., have now largely been eliminated.

In the aerosol dispensing system of the present invention, a liquid product is contained at a pressure above atmospheric pressure within compressible container means within an outer container with the container means preferably comprising a flexible or collapsible inner container as provided by a barrier pack dispenser. In admixture with the liquid product is a small quantity of a neutral gas (herein termed a neutral propellant) which is a liquid and is soluble or miscible to some extent in the product. A mechanical breakup spray head which generally employs a swirl zone having projections therein which impinge upon the product as it is moved rapidly through the swirl zone is connected to the compressible container means while means are provided to compress the compressible container means, e.g., a second propellant may be present in a propellant region bounded by the interor of an outer container and the exterior of a flexible inner container. The second propellant may be present in the propellant region in an amount sufficient to generate a pressure differential between the propellant region and the flexible inner container of about 5 psig or higher, e.g., 15 or 30 psig or higher, which is sufficient to discharge the product with the neutral propellant therein through a mechanical breakup spray nozzle on opening of a valve connecting the compressible container means with the spray nozzle.

On passage of the product through the mechanical breakup spray nozzle in the present aerosol dispensing system, the neutral propellant is at least partially vaporized at atmospheric pressure or less and its solubility or miscibility in the product is reduced. This gassifies the neutral propellant within the mechanical breakup spray nozzle to provide additional turbulence such that the product is broken up and issues from the spray nozzle as a finely divided spray.

The neutral propellant present in the product within the compressible container means is generally present in a small amount such as about 10 percent by volume or less and preferably about 6 percent by volume or less although for some specific products, such as a heavy viscosity product where the neutral propellant acts as a solvent to decrease viscosity, the neutral propellant may range up to about 25 percent by volume. Desirably, the neutral propellant is soluble to some extent in a liquid state in the liquid product to decrease the viscosity of the liquid product. Also, the neutral propellant preferably has a vapor pressure of about 30 psig or higher but may be relatively low, e.g., about 17 psig, depending on the nature of the product.

In another aspect of the invention, the product within the compressible container means is a powder such as aluminum chlorhydrate, talc, corn starch, etc. When the product is a finely divided powder, the neutral propellant may be present in a larger quantity than the generally 101 percent or less used for a liquid product. With a product which is a finely divided powder, the neutral propellant is present in a liquid state in a sufficient quantity to form a slurry with the powdered product and to, thereby, carry the finely divided powder into the mechanical breakup spray head. As an example, the liquified neutral propellant may, in the case of a powder product, be present in an amount up to about 25 percent or more by weight of the powder product. Also present in a powder product may be an emolient oil, such as isopropyl myristate, which makes a powder product cling to the body.

BRIEF DESCRIPTION OF THE DRAWINGS

The invention may be more fully understood from the following detailed description taken together with the accompanying drawing wherein.

DETAILED DESCRIPTION

Figure 1:
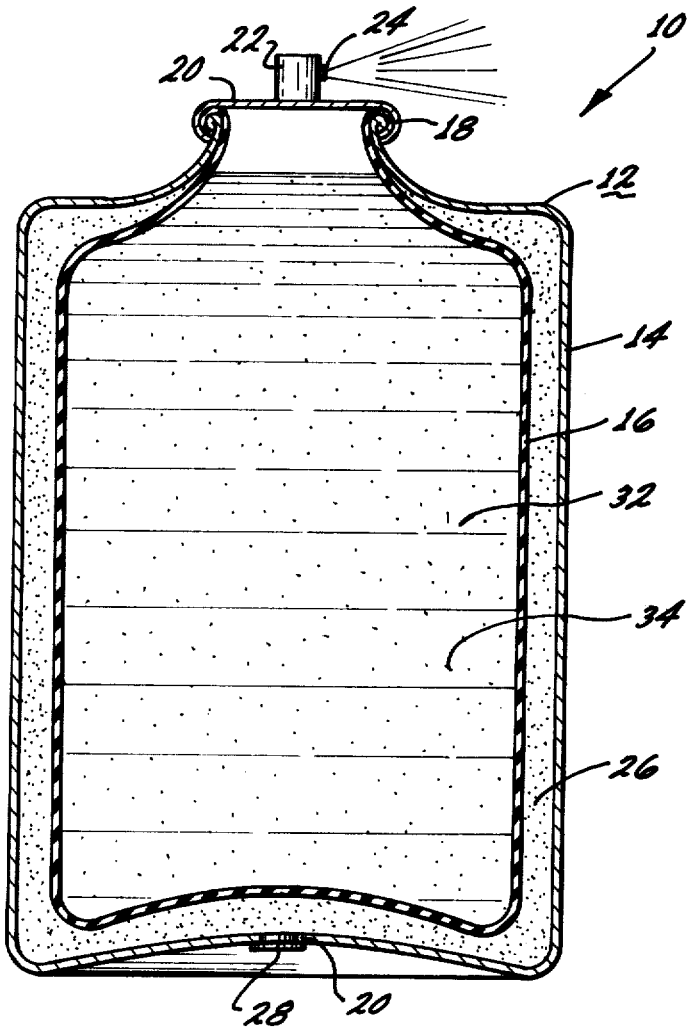
FIG. 1 illustrates a preferrred embodiment of a dispensing arrangement according to the principles of the present invention.

Referring now to the drawing, there is illustrated an embodiment generally designated 10 of an aerosol dispensing system according to the principles of the present invention. The aerosol dispensing system 10 is generally comprised of a barrier pack container generally designated 12 which includes a rigid outer container 14 and a flexible bag or bladder 16 contained therein. Instead of using a flexible bag 16, other forms of a compressible container means may be employed as a piston dispenser in which a piston is slidably received within a container with the product placed on one side of the piston and means to compress the piston, such as a spring means or a propellant, placed on the other side of the piston. Also, the compressible container means may be a resiliently expandable bag which is formed of an elastic material such that the bag in its expanded condition exerts a compressive force on a product within the bag. The flexible bag or bladder 16 may be coupled to the rigid outer container 14 at the top 18 thereof in fluid tight sealing relationship by crimping a mounting cup 20 thereon. The mounting cup 20 is a part of a valve assembly 22 which includes a mechanical breakup spray head 24 through which the aerosol dispersion is dispensed.

Barrier pack containers are commercially available in various volumetric sizes and may be obtained, for example, from Continental Can Company, American Can Company, or other suppliers.

The valve assembly 22 is also commercially available from various manufacturers such as Precision Valve Corporation or Aerosol Research Company. The dispensing head 24, in accordance with the principles of the present invention, is a mechanical breakup head which is also available as part of the valve assembly 22.

A second propellant generally designated 26 is contained between the flexible bag 16 and the rigid outer container 14 and may be retained therein by a stopper means 28 inserted in a fill aperture 30 in the rigid outer container 14.

The product to be dispensed 32 is contained within the flexible bag 16. For example, the product to be dispensed may be a comparatively viscous ingestible food product such as a vegetable oil which is dispensed as a comparatively fine spray from the dispensing head 24. According to the principles of the present invention, there is also a neutral propellant generally designated 34 contained within the flexible bag 16.

According to the principles of the present invention, the second propellant may be essentially any propellant such as Freon-12, chlorinated hydrocarbons, vinylchlorides, propane, isobutane, carbon dioxide, or the like. In the system 10 shown in FIG. for example, a mixture of isobutane and propane may be utilized as the second propellant 26 and such a mixture may have a vapor pressure, at 70° F., in the range of 40 to 80 psig. Since the second propellant 26 does not come in contact with the product 32 within bag 16, any propellant is satisfactory which is compatible with the structure of the barrier pack 12.

The neutral propellant 34 must be miscible to some extent in the product 32. Preferably, the neutral propellant 34 is sufficiently soluble in the product 32, in the case of a liquid product, to lower the viscosity of the product and to, thereby, make the product easier to eject through the dispensing head 24. For the reasons stated previously, the particular neutral propellant 34 which is employed will be dependent on the nature of the product 32. If the product 32 is a water base product or an ingestible food product, the neutral propellant 34 will generally be a hydrocarbon, since halogenated propellants are generally not compatible with water base products and their toxicity generally precludes their use in ingestible food products.

Suitable neutral propellants may include, for example, propane, isobutane, n-butane, hexane, and non-hydrocarbon gases such as nitrous oxide, carbon dioxide, nitrogen, and the like. The neutral propellant may be in a liquified state mixture admixture with a liquid product or a portion of the neutral propellant may, for example, be present in the product in the form of a gas-in-liquid solution, particularly preferred neutral propellants for use in the present aerosol system are propane, isobutane, and n-butane since these propellants are generally approved for use in ingestible food products. Also, these propellants have, in general, a reasonable solubility in a wide variety of liquid products. However, since the solubility of a neutral propellant in a liquid product will vary, depending on the particular nature of the liquid product, a particular neutral propellant or mixure of neutral propellants may be chosen to optimize the solubility of the neutral propellant or propellants in a particular product or to minimize the viscosity of the liquid product.

The product 32, if a liquid, is one which does not produce any appreciable foaming on ejection through the dispensing head 24. Also, the content of neutral propellant 34 in a liquid product 32 is generally maintained at a sufficiently low level to not produce bubbles in the product after it has been sprayed onto a surface of some kind through the dispensing head 24.

Depending on the nature of the product 32, the neutral propellant 34 may also be a halogenated hydrocarbon, i.e., the liquid product not being a water base product and not being an ingestible food product. If a halogenated hydrocarbon or mixture of halogenated hydrocarbon propellants is used as the neutral propellant, the neutral propellant preferably have a relatively low vapor pressure, such as about 17 psig and preferably about 30 psig or higher. Thus, the second propellant pressure may be reasonably low while providing a sufficient differential pressure to eject the product and neutral propellant through a mechanical breakup spray head in producing a fine spray of the product.

Table I illustrates the characteristics of propane, isobutane and butane as may be utilized for the second propellant 26 and also for the neutral propellant 34. It will be appreciated, however, that while only propane and isobutane have been listed in Table I, various mixtures thereof may be obtained to achieve a vapor pressure anywhere between 31 and 107.8 psig at 70° F., depending upon the second desired pressure for the propellant 26 or neutral propellant 34. Further, as noted above, other propellant gases may equally well be utilized as the second propellant 26.

TABLE I

| Property | Second Propellant: Hydrocarbon Propellant A-108 Propane | Second Propellant: Hydrocarbon Propellant A-31 Isobutane | Neutral Propellant: Hydrocarbon Propellant A-17 Food Grade Butane | Test Method |
|---|---|---|---|---|
| Composition, mol % | | | | |
| Ethane | Trace | — | — | Chromotography |
| Propane | 99.3 | .4 | .08 | |
| Isobutane | .6 | 96.3 | .8 | |
| Normal Butane | — | 3.2 | 98.54 | |
| Pentanes | — | — | .48 | |
| Total Saturates | min 99.9 | min 99.9 | | Chromotography |
| Vapor Pressure psig at 70° F. | 107.8 | 31.0 | 17.0 | ASTM D-1267 (mod. 70° F.) |
| Sulfur, ppm | NIL | NIL | NIL | ASTM D-1266 |
| Residue, g/100 ml | NIL | NIL | NIL | ASTM D-1353 |
| Acidity of Residue | neutral | neutral | neutral | ASTM D-1093 |
| Odor | pass | pass | pass | Panel |
| Water, ppm | 0.0005 | 0.9995 | 0.0005 | C.F. |

If desired, in order to further enhance the dispersion characteristics of the product to be dispensed 32 contained within flexible bag 16, a surfactant may be added thereto. If the fluid product 32 is an ingestible food, the surfactant must be non-toxic and substantially odor-free and taste-free. It has been found that a food grade surfactant such as polysorbate 80 USP available from Atlas Chemical Division is a satisfactory surfactant when utilized with, for example, vegetable oils.

The surfactant may be added to a fluid product in an amount sufficient to reduce the surface tension of the fluid to a desired level for spraying of the product, e.g., approximately 0.01 to 0.5 percent by weight of the product. The surfactant reduces the surface tension of the fluid to be dispensed 32 and thus allows dispensing of the fluid 32 in a much finer dispersion spray.

When the above mentioned food grade butane is utilized as the neutral propellant 34 mixed with a vegetable oil, it has been found that maintaining the ratio of butane to the fluid to be dispensed 32 at approximately a maximum of one part by volume butane to seven parts by volume fluid 32 provides satisfactory operation and yet is below the flammability limit for the butane.

Depending upon the viscosity of the fluid to be dispensed as well as the vapor pressure of the second propellant gas 26, the vapor pressure of the neutral propellant 34 may, for example, be in the range of about 5 to about 40 psig or higher at 70° F., such as 3, or 50 psig.

When the fluid to be dispensed 32 is vegetable oil and the neutral propellant 34 is the above described butane, the second propellant gas 26 may be a mixture of isobutane and propane having a vapor pressure at 70° F. of approximately 70 psig. This provides a differential pressure across the flexible bag 16 of 53 psig.

In operation, when the valve assembly 22 is activated, the second propellant 26 squeezes the flexible bag 16 and the fluid 32 and neutral propellant 34 are forced through the breakup head 24. In the mechanical breakup head 24, which may be described as a swirl chamber, the fluid is directed into paths which supply centrifugal force to the fluid or other types of breakup arrangements may be utilized, and the fluid is then dispersed through the orifice of the head.

The neutral propellant which is present in the product 32 is at least partially vaporized within the breakup head 24. Also, the solubility of the neutral propellant 34 in the product 32 is reduced by the action of the mechanical breakup head 24 on the product 32. This provides gassification of the neutral propellant or propellants within the breakup head 24 which produces a very high degree of turbulence to break up the product into fine particles.

The product, if a liquid, is relatively non-foaming. Further, since the neutral gas or gases are present at a relatively low concentration in the product, essentially all of the neutral propellant is evaporated within the mechanical breakup spray head or shortly thereafter on contact of the neutral propellant or propellants with the atmosphere.

As stated, the vapor pressure of the neutral propellant or mixture of propellants 34 is generally low since the function of the neutral propellant is not to act as a primary propellant, such as the second propellant but rather is to vaporize within the mechanical breakup spray head 24 to assist in breaking up the product into smaller particles which exit from the spray head as a fine spray. Thus, the neutral propellant or mixture of propellants 34 may have a vapor pressure of 0 psig or lower so long as the neutral propellant or propellants are vaporized within the mechanical breakup spray head 24. As an example, n-butane has a vapor pressure of about 0 psig at about 50° F. and an aerosol dispensing system according to the invention using n-butane as a neutral gas functions at an ambient temperature of 50° F.

When the vapor pressure exerted by the neutral propellant is increased to about 30 psig or higher, I have found that a lower differential pressure may be employed across the flexible bag 16 in expelling the product through the high mechanical breakup spray head 24. Further, when the vapor pressure of the neutral propellant is increased, I have found that a lower quantity of neutral propellant may be used, depending upon the particular nature of the product, in obtaining a fine spray through the high mechanical breakup spray head 24. To illustrate, when the neutral propellant is A-31 (as described in Table I), the quantity of neutral propellant required in obtaining a fine spray for a particular product may generally be decreased from the amount of neutral propellant which is required if n-butane is employed as the neutral propellant since the A-31 gas has a vapor pressure at standard conditions of about 31 psig while n-butane has a vapor pressure at standard conditions of about 17 psig. Also, when A-31 gas is utilized as a neutral propellant, the differential pressure between the inside of the flexible bag 16 and the propellant region outside the bag may generally be decreased from what is required when n-butane is the neutral propellant.

Similarly, if the commercial gas A-46 is employed as a neutral propellant (A-46 being a commercial blend of n-butane, isobutane and propane having a vapor pressure under standard conditions of about 46 psig), the quantity of neutral propellant may be decreased even further from the amount required when A-31 is the neutral propellant. Also, using A-46 as the neutral propellant, the differential pressure between the interior of the bag 16 and the propellant region outside the bag may be decreased even further.

In tests which were performed in the spraying of an anti-perspirant powder, it was found that A-46 gas could be employed both as the neutral propellant and also as the second propellant providing that a vapor depressant was admixed with the neutral propellant within flexible bag 16. In this test, the vapor depressant which was added was a halohydrocarbon (Freon-11, Freon being a trademark of E. I. DuPont de Nemours & Company) with the vapor pressure suppressant being present in an amount sufficient to reduce the vapor pressure within the flexible bag 16 by about 2 psig. The differential pressure across the flexible bag 16 was, thus, in this case only about 2 psig.

The use of a neutral propellant having a higher vapor pressure such as about 30 psig or higher, is particularly advantageous in an aerosol dispensing system in which the product is a finely divided powder. Through use of a neutral propellant having a higher vapor pressure, there is less clogging of the high mechanical breakup spray head by the finely divided powder as it passes through the spray head. Further, the use of a neutral propellant having a higher vapor pressure such as about 30 psig or higher, provides a sprayed product which is essentially dry on contact with the skin of the user in the case of a personal product, e.g., an anti-perspirant powder. This is advantageous because the contact of a wetted product with the user's skin, e.g., an anti-perspirant powder that is wetted with n-butane that has not vaporized, produces a cold sensation which many users may find undesirable.

The use of a neutral propellant which has a higher vapor pressure, such as about 30 psig or higher at standard conditions of temperature and pressure, provides greater turbulence when the mixture of neutral propellant and product (either a relatively non-foaming liquid or a finely divided powder) passes through the high mechanical breakup spray head. This is advantageous because the greater turbulence produced within the spray head by the gassification of the neutral propellant is more effective in providing a product in the foam of a finely divided spray.

Immediately after leaving the terminal orifice of the high mechanical breakup spray head, the neutral propellant undergoes evaporation with the rate of evaporation being dependent upon the vapor pressure of the neutral propellant which may be altered by the presence of other propellants, such as a vapor pressure depressant, that may be present in minor amounts in conjuction with the major propellant component. In general, as the vapor pressure of the neutral propellant is increased, the neutral propellant will evaporate more rapidly after leaving the terminal orifice of the high mechanical breakup spray head. Through rapid evaporation of the neutral propellant after leaving the terminal orifice of the high mechanical breakup spray head, the product may contain little or no neutral propellant when it contacts the surface or object against which it is being sprayed. This is advantageous in a personal use product, as stated, since the product is in an essentially dry state when it contacts the body of the user. Further, in a product such as a paint, the pressure of unevaporated neutral propellant within the paint after its contact with the surface to be painted may be undesirable since the evaporation of the neutral propellant may prevent the formation of a smooth painted surface.

Still another advantage which flows from the use of a neutral propellant having a higher vapor pressure, such as about 30 psig or higher under standard conditions, is a reduction in the flammability of the sprayed aerosol product. While flammability may be defined in several ways, one way in which flammability of aerosols has been defined is in terms of whether the sprayed product is flammable at a distance of one foot from the terminal orifice of the spray head. Using this criteria for flammability, if the neutral propellant has a vapor pressure such as about 17 psig in the case of n-butane, the neutral propellant may not be completely evaporated within the time required for the sprayed product to traverse a distance of one foot from the terminal orifice and the n-butane which is still evaporating will produce a flammable mixture. If, however, the neutral propellant has a higher vapor pressure than that of n-butane, the neutral propellant will be substantially evaporated from the sprayed propellant product within the first foot of travel from the terminal orifice of the high mechanical breakup spray head. The neutral propellant will, then, not be present when the sprayed product contacts a flame source at a distance of one foot from the terminal orifice and the sprayed product will have a greatly reduced flammability.

A still further advantage of using a neutral propellant with a higher vapor pressure is that its use may permit a marked reduction in the delivery rate of the sprayed aerosol product. In accord with the present invention, a much higher content of product (whether a relatively non-foaming liquid product or a finely divided powder product) may be present within the aerosol container as compared with previous aerosol products in which the propellant gas was mixed directly with the product. While this is advantageous because it is a more efficient means of product delivery, the very efficiency of the system may create problems in regard to the product delivery rate.

With a much greater quantity of product being present within the aerosol container, the delivery rate may be many times that of a conventional aerosol. This may be undesirable since it may result in dispensing a much larger quantity of product through the high mechanical breakup spray head than is actually needed or desired by the user. By using a neutral propellant having a higher vapor pressure under standard conditions, such as about 30 psig or higher, a lower differential pressure may be used between the interior of flexible bag 16 and the exterior of the flexible bag. This provides a reduction in the product delivery rate with the reduction being proportional to the decrease in the differential pressure across the flexible bag 16.

In spray testing an anti-perspirant powder while using n-butane as the neutral propellant, it was generally necessary to use a differential pressure across the flexible bag 16 of about 30 psig with the delivery rate of product and neutral propellant leaving the high mechanical breakup spray head being about 2½ grams per second. When the neutral propellant was then changed from n-butane to the commercial A-31 gas as described previously, the differential pressure across the flexible bag 16 could be reduced to about 15 psig while still providing a very fine spray of the aerosol product. By reducing the differential pressure across the flexible bag 16 from about 30 psig to about 15 psig, the delivery rate of the product and neutral propellant through the high mechanical breakup spray head was approximately halved and the delivery rate was then in the order of about one gram per second. This was very desirable since a delivery rate of one gram per second was quite adequate for application of a powdered anti-perspirant.

By reducing the delivery rate of a product such as a powdered anti-perspirant, the use life of product, product may be greatly increased as well as providing a safer product in which the user does not apply an amount of the product which might, in some cases, be actually harmful. In an anti-perspirant powder formulation, the active ingredient is aluminum chlorhydrate which is generally present in admixture with a neutral cosmetic powder such as talc. The content of aluminum chlorhydrate with respect to talc will be dependent upon the application rate of the product in the form of an aerosol spray. If the application rate is relatively high, the content of aluminum chlorhydrate may have to be reduced while the content of talc and other ingredients is increased to insure that the user does not injure himself by applying too great an amount of aluminum chlorhydrate. Thus, even though aluminum chlorhydrate is the effective component, it may be necessary to supply the user with a larger quantity of inert materials merely as a safeguard to prevent injury.

A more satisfactory solution, which is made possible by the present invention through increasing the vapor pressure of the neutral propellant, is to tailor the aerosol dispensing system to permit a lower differential pressure across the flexible bag 16. The percentage of the active ingredient in the overall formulation may then be increased without running a danger of injury to the user through over application of the active ingredient. For example, when the delivery rate of product is cut in half, it may then be possible to double the content of the active ingredient in the product. The product is, thus, a more effective product with longer use life than previous products that were dispensed at a relatively high delivery rate due to the make-up of the propellant delivery system.

A still further result which follows from use of a reduced product delivery rate is that the discharge of neutral propellant into the atmosphere during use of the propellant system is also reduced. As stated previously, the quantity of neutral propellant which is required in any of the various product formulations of my aerosol dispensing system is markedly reduced as compared with the quantity of propellant gas that was discharged to the atmosphere in previous aerosol dispensing systems where the primary gas was admixed directly with the product. However, even in the case of the present aerosol system, there is still some discharge of gas to the atmosphere along with discharge of the product. Thus, even in the case of the present system, it would be desirable to reduce the discharge rate of neutral propellant to the atmosphere. By increasing the vapor pressure of the neutral propellant to a level of about 30 psig or higher, the content of neutral propellant in the aerosol product may be reduced while still obtaining a finely divided aerosol spray. Also, the differential pressure across the flexible bag 16 may be reduced to reduce the delivery rate of the product and neutral propellant through the high mechanical breakup spray head.

By, thus, reducing the content of neutral propellant in the product and also reducing the delivery rate of the product, a marked reduction in the discharge rate of the neutral propellant to the atmosphere may be obtained during discharge of the aerosol product through the high mechanical breakup spray head. This is particularly desirable if a halohydrocarbon is present either as a neutral propellant or as a component in a neutral propellant mixture since halohydrocarbons are considered to be potentially very harmful to mankind.

In defining a preferred vapor pressure under standard conditions for the neutral propellant, reference has bee made heretofore to a vapor pressure of about 30 psig or higher. While a neutral propellant having a much higher vapor pressure than 30 psig, such as about 100 psig, may be used, such a neutral propellant would generally be impractical since its use would require a stronger container which would increase the cost of the overall system. For reasons of practicality, the neutral propellant will, therefore, generally not have a vapor pressure in excess of about 50 psig although there is no reason why a neutral propellant having a higher vapor pressure could not be employed if the nature of the product would justify the added cost of using a suitable high pressure container.

With the increasing emphasis on environmental quality, it is conceivable that at some future time the use of higher pressure aerosol containers may be made practical by legislation which restricts the discharge of volatile solvents and the like into the atmosphere from aerosol products. If this should occur, a product, such as a frying pan oil, could then not be thinned by the inclusion of solvents and the frying pan oil would have to be dispensed in a much more viscous state as an aerosol. This would then require the use of higher propellant pressures and it would be economically feasible to discharge the more viscous product according to the present aerosol dispensing system through use of a neutral propellant having a much higher vapor pressure at standard conditions such as 100 psig.

In charging a barrier pack container with an aerosol system according to the invention, the flexible inner bag 16 is preferably vacuum evacuated and then charged with product. Following this, the neutral propellant or mixture of propellants is preferably charged to the second inner bag 16 and the propellant is then charged to the propellant region between the flexible bag 16 and the rigid outer container 14. Preferably, the second propellant is charged after charging with the neutral propellant or mixture of propellants since the neutral propellant or mixture of neutral propellants is easier to charge prior to charging with the propellant. A method of charging a barrier pack container with an aerosol dispensing system according to the invention is disclosed in my prior [copending] application entitled "METHOD OF FILLING AN AEROSOL DISPENSING ARRANGEMENT" Ser. No. 466,306, filed May 2, 1974, now abandoned, the subject matter of which is incorporated herein by reference.

As stated previously, the present aerosol dispensing system is admirably suited for various products which cannot presently be dispensed as an aerosol, such as a vinyl latex or a vinyl-acrylic water base paint. Also, the aerosol dispensing system of the invention may be used with products, such as water base hair sprays, which may be dispersed as an aerosol through conventional aerosol systems. In the use of the present aerosol dispensing system for a water base hair spray, the water content of the hair spray may advantageously be reduced to provide a fine mist spray which is not as wet as existing aerosol hair spray formulations. The high water content of existing hair spray formulations is dictated by parameters of existing aerosol dispensing systems which do not apply to the aerosol dispensing system of the invention. Thus, by using the aerosol dispensing system of the invention, the make-up of many products, such as hair spray formulations, may now be radically altered while providing the product as a fine spray. The present aerosol dispensing system, thus, makes possible a host of new aerosol products whose make-up is not subject to the limitations imposed by previous aerosol dispensing systems in which the product was intermixed with a relatively large volume of a propellant that provided the driving force for expelling the product through a spray head.

As stated previously, a mechanical breakup spray head is an integral part of the present aerosol dispensing system with the neutral propellant or propellants being at least partially vaporized within the spray head. Many mechanical breakup spray heads are known and, in general, these spray heads are characterized by the use of a swirl chamber within which the product is submitted to centrifugal force before ejection of the product through an orifice into the atmosphere. In general, any of the various mechanical breakup spray heads may be used in the present aerosol dispensing system and the use of a particular type of spray head is not required by the system.

I claim:

1. An aerosol dispensing system comprising:

an outer container;

compressible inner container means positioned within said outer container;

means to compress said inner container means positioned between said inner container means and said outer container;

a mechanical breakup spray head and valve assembly connected to said inner container means; *said mechanical breakup spray head including a discharge orifice and a swirl chamber with the material being discharged passing through the swirl chamber and being subjected to centrifugal force therein before being ejected through said discharge orifice;* a relatively non-foaming liquid product at a pressure above atmospheric pressure within said inner container means due to the force exerted on the inner container means by said means to compress said inner container means;

a neutral propellant within said inner container means;

said neutral propellant being in a liquid state at the pressure within said inner container means and being at least partially soluble or miscible in said liquid product, and said neutral propellant being at least partially vaporized at atmospheric pressure or less on passage of said product and neutral propellant through said spray head to create a turbulence within said spray head which produces breaking up of said liquid product into a fine spray.

2. The aerosol dispensing system of claim 1 wherein said liquid product is a water-base product, and said neutral propellant is a hydrocarbon gas.

3. The aerosol dispensing system of claim 2 wherein said neutral propellant propane.

4. The aerosol dispensing system of claim 2 wherein said neutral propellant contains n-butane.

5. The aerosol dispensing system of claim 2 wherein said neutral propellant contains isobutane.

6. The aerosol dispensing system of claim 2 wherein said liquid product is a water-base paint.

7. The aerosol dispensing system of claim 1 wherein said liquid product is an ingestible food product, and said neutral propellant is a non-toxic hydrocarbon or non-hydrocarbon gas.

8. The aerosol dispensing system of claim 7 wherein said neutral propellant contains propane.

9. The aerosol dispensing system of claim 7 wherein said neutral propellant contains n-butane.

10. The aerosol dispensing system of claim 7 wherein said neutral propellant contains isobutane.

11. The aerosol dispensing system of claim 1 including said compressible inner container means being a flexible bag;

a propellant region between said flexible bag and said outer container;

a second propellant in said propellant region, and said second propellant exerting a differential pressure across said flexible bag sufficient to eject said product and said neutral propellant through said mechanical breakup spray head on opening of said valve assembly.

12. The aerosol dispensing system of claim 1 wherein said neutral propellant has a vapor pressure of about 30 psig at standard conditions.

13. The aerosol dispensing system of claim 11 wherein said neutral propellant has a vapor pressure of about 30 psig at standard conditions.

14. A barrier pack aerosol dispensing system comprising:

an outer container;

a flexible inner container positioned within said outer container;

a propellant region between said inner container and said outer container;

a mechanical breakup spray head and valve assembly connected to said inner container; *said mechanical breakup spray head including a discharge orifice and a swirl chamber with the material being discharged passing through the swirl chamber and being subjected to centrifugal force therein before being ejected through said discharge orifice;* a relatively non-foaming liquid product within said inner container;

a neutral propellant within said inner container;

said neutral propellant being in a liquid state within said inner container and being at least partially soluble or miscible in said liquid product;

a second propellant in said propellant region;

said second propellant exerting a differential pressure across said inner container of at least about 30 psig sufficient to eject said product and said neutral propellant through said mechanical breakup spray head on opening of said valve assembly;

said neutral propellant being present in an amount of about 10 percent or less by volume of the volume of said product and said neutral propellant, and said neutral propellant being at least partially vaporized at atmospheric pressure or less on passage of said product and neutral propellant through said spray head to create a turbulence within said spray head which produces breaking up of said liquid product into a fine spray.

15. The barrier pack aerosol dispensing system of claim 14 wherein said liquid product is a water-base product, and said neutral propellant is a hydrocarbon gas.

16. The barrier pack aerosol dispensing system of claim 15 wherein said neutral propellant is propane.

17. The barrier pack aerosol dispensing system of claim 15 wherein said neutral propellant is n-butane.

18. The barrier pack aerosol dispensing system of claim 15 wherein said liquid product is a water-base paint.

19. The barrier pack aerosol dispensing system of claim 14 wherein said liquid product is an ingestible food product, and said neutral propellant is a non-toxic hydrocarbon or non-hydrocarbon gas.

20. The barrier pack aerosol dispensing system of claim 19 wherein said neutral propellant is propane.

21. The barrier pack aerosol dispensing system of claim 19 wherein said neutral propellant is n-butane.

22. The barrier pack aerosol dispensing system of claim 14 wherein said neutral propellant is present in an amount of about 6 percent by volume or less of the volume of said product and said neutral propellant.

23. The barrier pack aerosol dispensing system of claim 14 including a surfactant in said liquid product in an amount sufficient to reduce the surface tension of said product to a level suitable for dispersion of said product as a spray of fine particles.

24. The barrier pack aerosol dispensing system of claim 14 wherein said liquid product is an ingestible vegetable oil, and said neutral propellant is a non-toxic hydrocarbon.

25. The barrier pack aerosol dispensing system of claim 24 wherein said neutral propellant is propane.

26. The barrier pack aerosol dispensing system of claim 24 wherein said neutral propellant is n-butane.

27. An aerosol dispensing system comprising:

an outer container;

compressible inner container means positioned within said outer container;

means to compress said inner container means positioned between said inner container means and said outer container;

a mechanical breakup spray head and valve assembly connected to said inner container means; *said spray head including a discharge orifice and a swirl chamber with the material to be discharged passing through the swirl chamber and being subjected to centrifugal force therein before being ejected through said discharge orifice;* a finely divided powder product at a pressure above atmospheric pressure within said inner container means due to the force exerted on said inner container means by said means to compress said inner container means;

a liquified neutral propellant within said inner container means;

said neutral propellant being present in an amount sufficient to form a slurry with said product and to carry said product into said spray head during discharge of said product, and said neutral propellant being at least partially vaporized at atmospheric pressure or less on passage of said product and neutral propellant through said spray head to create a turbulence within said spray head which produces a fine powder spray.

28. The aerosol dispensing system of claim 27 wherein said neutral propellant is present in an amount ranging up to about 25 percent by weight or more of said product.

29. The aerosol dispensing system of claim 27 including said inner container means being a flexible bag;

a propellant region between said flexible bag and said outer container;

a second propellant in said propellant region, and said second propellant exerting a differential pressure across said flexible bag sufficient to eject said product and said neutral propellant through said mechanical breakup spray head on opening of said valve assembly.

30. The aerosol dispensing system of claim 27 wherein said neutral propellant a vapor pressure of about 30 psig at standard conditions.

31. The aerosol dispensing system of claim 30 wherein said neutral propellant contains propane.

32. The aerosol dispensing system of claim 30 wherein said neutral propellant contains isobutane.

33. The aerosol dispensing system of claim 29 wherein said neutral propellant has a vapor pressure of about 30 psig at standard conditions.

34. The aerosol dispensing system of claim 33 wherein said neutral propellant contains propane.

35. The aerosol dispensing system of claim 33 wherein said neutral propellant contains isobutane.

* * * * *